Oct. 6, 1936.　　　H. L. COLBY　　　2,056,420
CONTROL MECHANISM
Filed Oct. 10, 1931　　　2 Sheets-Sheet 1
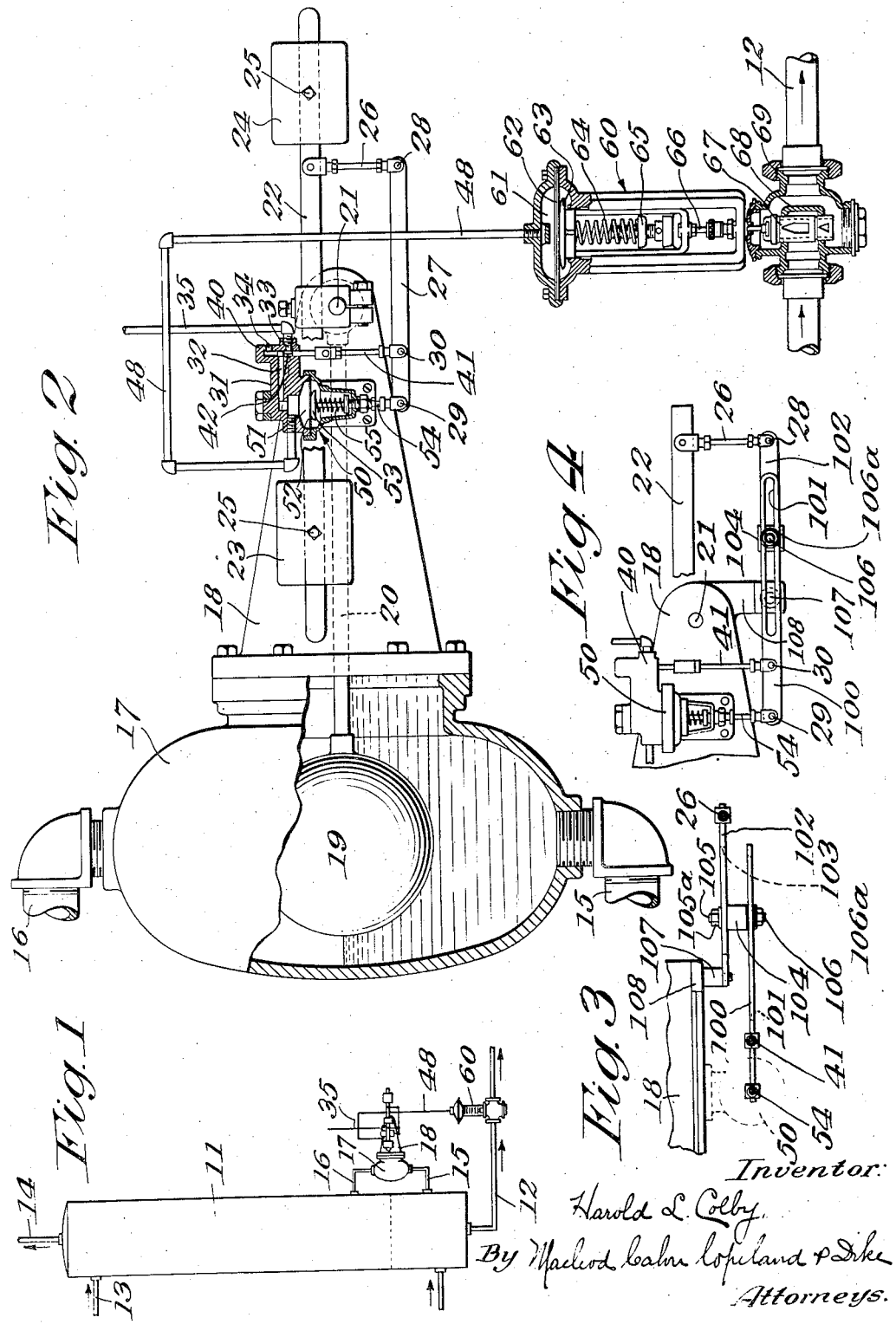

Oct. 6, 1936.   H. L. COLBY   2,056,420
CONTROL MECHANISM
Filed Oct. 10, 1931   2 Sheets-Sheet 2
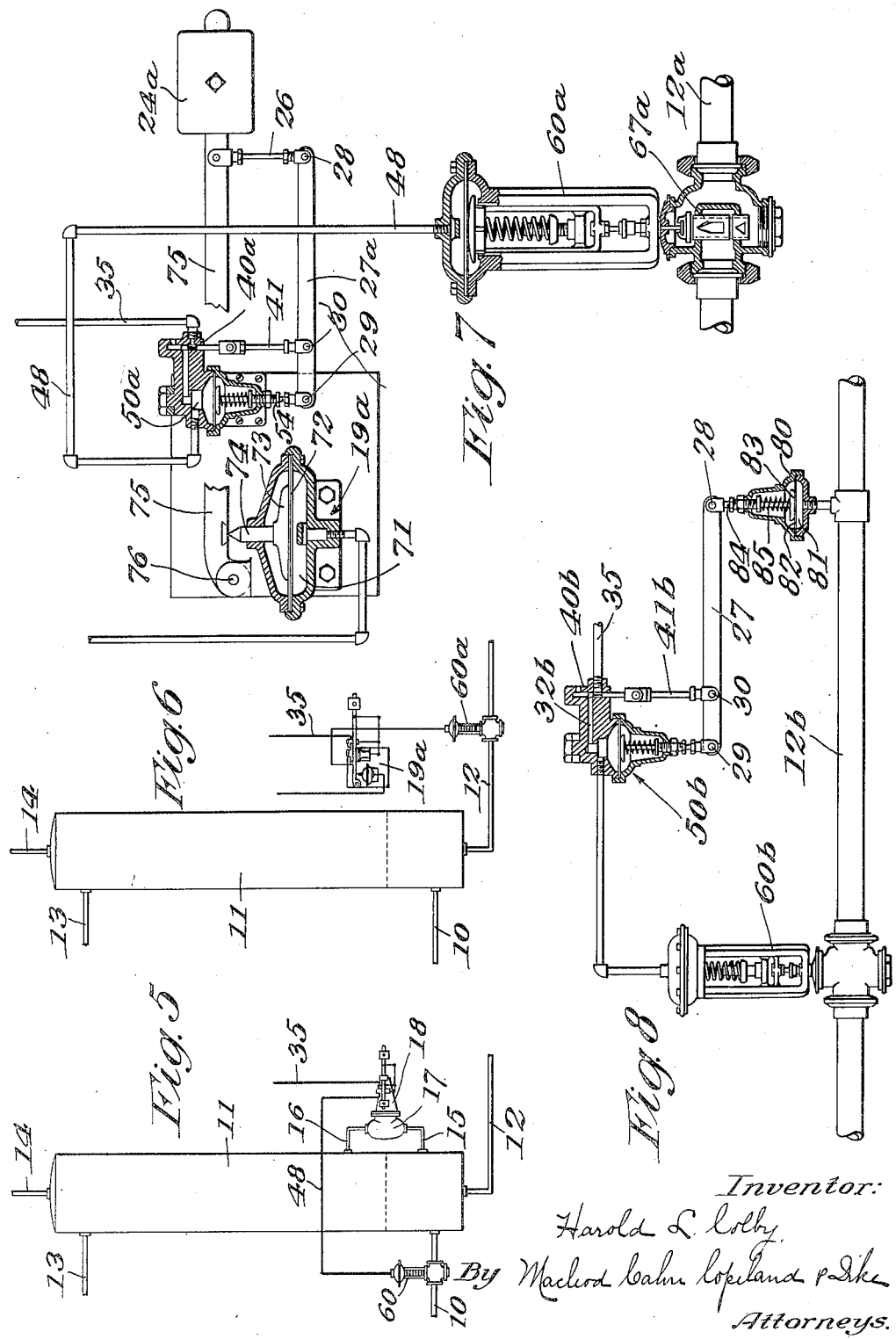
Inventor:
Harold L. Colby.
By Macleod Calver Copeland & Dike
Attorneys.

Patented Oct. 6, 1936

2,056,420

UNITED STATES PATENT OFFICE 2,056,420

CONTROL MECHANISM

Harold L. Colby, Milton, Mass., assignor to Charles W. McConnel, Eldon Macleod, and Frank A. Morrison, trustees, doing business as Mason Neilan-Regulator Company, Boston, Mass.

Application October 10, 1931, Serial No. 568,195

1 Claim. (Cl. 137—101)

This invention relates to control mechanism, and particularly to control mechanism having a compensating and fluid pressure pilot control.

The object of the invention is to provide a control mechanism for liquid level or pressure control which shall maintain the equipment in stabilized condition and free from hunting or intermittent action. A further object of the invention is to provide a positive means for preventing hunting or over-travel in combination with a pilot valve.

The invention is adapted for use particularly in industrial service, but is capable of use in any installation where a level or a pressure is being maintained. In industrial service, it is desirable to maintain an even flow of fluid in the system, and the amount of fluid going out to the line must be kept about the same as that entering the receiver or tank, in order to maintain the level in the receiver within certain limits. To maintain such even flow it is particularly desirable that there be no hunting or over-travel in the control means, and this is achieved by means of my invention. The invention is capable of being adapted to pressure control instead of liquid level control with certain modifications, as replacing the float by a pressure responsive element.

Other objects of this invention will appear in the following description and appended claim, reference being had to the accompanying drawings forming a part of the specification.

Fig. 1 is a diagrammatical view of the invention, as adapted to liquid level control as used in an oil line and absorption tower to control outgoing supply.

Fig. 2 is a detail side elevation of the control in Fig. 1 showing certain parts in cross section.

Fig. 3 is a plan view of the control shown in Figs. 1 and 2 with parts modified to provide a compound leverage and increase adjustability of the control to varying conditions.

Fig. 4 is a side elevation of the structure shown in Fig. 3.

Fig. 5 is a diagrammatical view of the same control as in Figs. 1 and 2 adapted to control incoming supply.

Fig. 6 is a diagrammatical view of the same invention adapted to pressure control.

Fig. 7 is a detail side elevation of the modification shown in Fig. 6 with certain parts in cross section.

Fig. 8 is a detail side elevation partly in section of the invention as adapted to pressure control, and used in connection with a reducing or back pressure valve.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Referring to the drawings in which my invention is shown adapted to oil field service, in Figs. 1 and 2, 10 represents the liquid supply pipe leading into the absorption tower 11. 12 represents the outgoing pipe line for liquid from the absorption tower 11, and pipes 13 and 14 respectively are inlet and outlet pipes leading to and from the tower 11. Mounted on the lower side of the tower below and above the normal level of liquid within the tower, are pipe connections 15 and 16 leading to the bottom and top of the float chamber 17, housing the float 19. Extending laterally from the float chamber 17 is the housing 18 for the float arm 20, which arm is pivoted at its outer end on the pin 21 set in the housing 18. Rigidly secured to the float arm 20 so as to move integrally therewith but outside the housing 18 is the lever 22, pivoting between its ends on the pin 21 and having the balancing weights 23 and 24 slidably mounted on both ends of said lever and adjustable as by the set screws 25.

Pivotally depending from the lever 22 adjacent its outer end and between pin 21 and outer weight 24 is the link 26, to the lower end of which the lever 27 is pivotally connected, as at 28, which lever 27 extends rearwardly toward the float chamber, in direction parallel to the lever 22. The other end of lever 27 is pivotally connected, as at 29, to the lower end of stem 54 of compensating diaphragm mechanism 50 to be later described. Also pivotally connected to lever 27 at a point intermediate its ends, as at 30, is the upwardly extending stem 41 of pilot valve 40.

A housing 31 encloses the pilot valve 40 and compensating diaphragm mechanism 50 and is rigidly mounted on the exterior of housing 18. Within the housing 31 a passage is provided for a controlling pressure system. The pressure system comprises the horizontal central passage 32, and vertical branching channels therefrom 33 and 34 comprising supply and waste ports respectively. Fluid pressure, such as compressed air, is supplied to the pressure system from supply pipe 35 entering the housing 31 through supply port 33. The fluid pressure is supplied through passage 32 to the chamber 51 of compensating diaphragm mechanism 50, and leads therefrom by appropriate connections 48 to the diaphragm motor valve 60, mounted on outlet line 12 leading from the tower 11. The pilot valve 40 governs supply and exhaustion from the pressure system and is of the two-way or supply and waste type, and moves in vertical channels or ports 33 and 34, cooperating with central passage 32, to allow pressure to be supplied thereto through port 33, or to waste therefrom, through port 34. The pilot valve comprises the valve stem 41 entering supply channel 33 from the bottom and having a reduced section 42 adjacent the fluid pressure supply port 33 and a head 43 normally closing passage 32 between the supply and waste ports 33 and 34 respectively. Thus moving valve stem 41 upwardly opens the pilot valve to supply position, the head 43 at the same time closing the waste port 34, while moving valve stem 41 downwardly opens the valve to waste position, the head 43 closing supply port 33 while opening waste port 34, allowing fluid pressure to exhaust through passage 32 and waste port 34.

The compensating diaphragm mechanism 50 may be of any suitable variety, but I prefer the common type, having a pressure chamber 51, a diaphragm 52, and a diaphragm button 53 on a stem 54, movement of which stem is resisted as by spring 55.

Diaphragm motor valve 60 may likewise be of any suitable variety, but I prefer the conventional design, having the diaphragm chamber 61, diaphragm 62, diaphragm button 63, resistance spring 64, spring button 65, valve stem 66, connecting with the poppet valve 67 arranged in the passage of outgoing pipe 12, poppet seat 68 and poppet housing 69.

The operation of my control is as follows: A drop in liquid level in float chamber 17 causes float 19 to drop, pivoting float arm 20 about its axis 21, and moving lever 22 about the same axis. The outer end of lever 22 accordingly moves upwardly raising link 26 and in turn raising lever 27, as fulcrumed at 29. This upward motion of lever 27 likewise moves valve stem 41 upwardly in its vertical channel, opening the pilot valve 40 to supply position, and allowing fluid pressure to enter the passage 32, diaphragm chamber 51, pipes 48 and diaphragm chamber 61 of diaphragm motor valve 60. Diaphragms 52 and 62 are set to act in response to the same pressure proportionally and in unison and accordingly as pressure builds up in the diaphragm chambers, the diaphragm stem 54 will move downwardly at the same time as diaphragm motor valve stem 66 moves downwardly to close the passage through outgoing pipe 12. Downward movement of compensating diaphragm stem 54 forces down lever 27, this time as fulcrumed at 28, which pulls down stem 41 of pilot valve 40, to diminish slightly the orifice from fluid pressure supply port 33 to passage 32. This in turn diminishes the supply of air pressure brought to diaphragm chambers 51 and 61, which permits reaction of diaphragm springs 55 and 64. Reaction of diaphragm spring 55 again slightly increases movement of valve stem 41 toward supply position, and at the same time reaction of diaphragm motor spring 64 slightly opens poppet 67 to increase flow through pipe 12. This action and reaction takes place until a practically static condition is reached, and until liquid level in tower 11 changes and requires further control. Thus compensation is positively provided by means of my invention.

When the liquid level in the float chamber 17 rises, an opposite action takes place. Lever 22 pivots with float arm 20 about its axis 21 depressing its outer end and moving lever 27 downward about the point 29 as a fulcrum, and drawing down valve stem 41 of the pilot valve 40 to close supply orifice 33 and opening the passage 32 to waste position, allowing pressure to exhaust through waste port 34. As partial exhaustion takes place, the pressure in diaphragm chambers 51 and 61 is lessened, allowing stems 54 and 66 of the compensating mechanism and motor valve respectively, to rise with the constant pressure of springs 55 and 64 respectively. The poppet 67 of the motor diaphragm valve then opens slightly to allow greater flow therethrough in outlet pipe 12, and at the same time lever 27 is drawn upwardly by the retreating stem 54 of the compensating mechanism, moving as fulcrumed at 28, to push upwardly the valve stem 41 of pilot valve 40 thereby closing slightly the orifice in passage 32 through which fluid pressure is exhausting. Thus a reverse compensating action is provided. In Figs. 1 and 2 compensating diaphragm mechanism 50 and motor diaphragm valve 60 are each limited to a range from zero pounds pressure to twenty-five pounds. When the pressure on the diaphragm motor valve is zero the poppet 67 is wide open, and as pressure is increased the poppet 67 closes until it is entirely closed at twenty-five pounds pressure. Movement in compensating diaphragm mechanism 50 is in the same proportion and in unison. It is to be understood, however, that the pressure operating the diaphragms can be varied in range, as desired, to meet other conditions. When the pressure range is to be limited as at twenty-five pounds, and greater pressure may be supplied, as in oil field service, a reducing valve (not shown) should be placed on pressure supply line 35, to provide a fixed maximum pressure. Sometimes a variation in liquid level in float chamber 17 of two or three inches, for instance, may be immaterial, and only greater fluctuations need be controlled. In this case, it is undesirable to have the control responsive to fluctuations within the three inch range, and in Figs. 3 and 4, I have accordingly shown a compound leverage with adjustable connections which may be substituted for lever 27 of Fig. 2, and which may be set to be unresponsive to fluctuations within the three inch range, or other limits as desired. Lever 100 pivotally connected with compensating diaphragm mechanism 50 and pilot valve 40 is slotted as at 101, and an additional lever 102 is provided pivotally connected at its right end to lever 22 by means of link 26, and also slotted as at 103 and at its left end is pivotally connected to the stud 107 rigidly fixed to bracket 108 attached to housing 18. Levers 100 and 102 are in turn connected by the block 104 having threaded pins 105 and 106 sliding in slots 101 and 103 respectively and receiving nuts 105a and 106a. Releasing one of the nuts 105a or 106a will accordingly allow the levers 100 and 102 to be adjusted to any desired ratio and thus vary the relative movement of link 26, and compensating diaphragm stem 54 and pilot valve stem 41, or between points 28, 29 and 30. Thus to a certain movement in float 19, and lever 22, a varied resulting control can be given as desired through adjustment of the block 104. A set screw arrangement can also be employed to make such adjustment of block 104.

In Fig. 5 the same mechanism as shown in Figs. 1 and 2 and described above is shown, but with the diaphragm motor valve 60 mounted on the incoming pipe 10 rather than the outgoing pipe 12, thereby controlling the ingoing flow of fluid through the absorption tower 11.

In Figs. 6 and 7 my invention is shown as modified and adapted for pressure control rather than liquid level control. A pressure responsive element 19a is substituted in place of the float 19, but the principle of operation is similar. The pressure responsive element 19a is preferably of conventional design, and the pressure to be controlled is led from tower 11 to chamber 71 enclosed by the flexible diaphragm 72, a button 73 with stem 74 supporting lever 75 as pivoted at 76. Lever 75 actuated by the pressure responsive element corresponds to lever 22 in Figs. 1 and 2 which is actuated by the float 19 while the rest of the structure is the same as that shown and described in Figs. 1 and 2 described above, except that one adjustable balancing weight 24a is mounted on lever 75 at its outer end. The operation is likewise similar. Increase of pressure in tower 11 extends diaphragm 72, raising button 73, stem 74 and lever 75 about its axis 76, to raise lever 27a and opening pilot valve 40a to supply position, allowing fluid pressure to actuate compensating diaphragm mechanism 50a, and motor diaphragm valve 60a, and decreasing the flow through outgoing line 12a. Compensation through diaphragm mechanism 50 is provided as in the liquid level control shown in Figs. 1 and 2. Likewise on decrease of pressure in tower 11, reverse action takes place and the motor valve 60a allows poppet 67a to open, permitting greater flow through outgoing pipe 12a.

In Fig. 8 a spring resisted pressure element 80 is shown as used in connection with a reducing or back pressure valve, rather than the weight resisted pressure element 70 of Figs. 6 and 7. The pressure responsive element or diaphragm mechanism 80, preferably of conventional design, has the pressure chamber 81, diaphragm 82, button 83, stem 84 and spring resistance 85. Again the operation is the same in principle. Increase in pressure in controlled line 12b forces up the stem 84 in diaphragm mechanism 80, raising the stem 41b of the pilot valve 40b and opening the pilot valve to supply position. As pressure builds up within chamber 32b motor diaphragm valve 60b and compensating diaphragm mechanism 50b are operated, the latter operating to decrease the size of the orifice leading into passage 32b, as before. The action is again reversed on a decrease in pressure in the control line 12b. If the diaphragm motor valve is used as a back pressure valve it is seated as in Fig. 7, but if used as a reducing valve it is merely reversed in seating.

By means of my invention, it will be seen that I have provided a liquid level or pressure control with a compensated pilot valve which is positive and direct in action and prevents the hunting or over-travel which is a common fault in liquid level or pressure control mechanism, and which is adaptable to many forms of control.

What I claim is:

A control mechanism of the class described, comprising a control valve governing the supply of a medium under control, a pressure system having branching supply and waste ports for operating said control valve, a source of fluid pressure for said system, a pilot valve mechanism governing the supply and waste of pressure in said system, a diaphragm mechanism in said pressure system and acted on by the pressure in said system, a float on a lever pivoted intermediate its ends and having balancing weights thereon, a second lever pivotally linked at one end to said pivoted lever between its pivot and one weight, and at its other end to said diaphragm mechanism, and intermediate its ends to said valve mechanism, whereby movement of said pivoted lever in response to said float moves said valve mechanism to supply or waste position, and said diaphragm mechanism counteracts the movement of said valve mechanism toward either position.

HAROLD L. COLBY.